United States Patent [19]
Heidelberg et al.

[11] Patent Number: 5,534,739
[45] Date of Patent: Jul. 9, 1996

[54] ELECTRIC MACHINE

[75] Inventors: Götz Heidelberg, Starnberg-Percha; Andreas Gründl; Peter Ehrhart, both of München, all of Germany

[73] Assignee: Magnet-Motor Gesellschaft für magnetmotorische Technik mbH, Starnberg, Germany

[21] Appl. No.: 852,204
[22] PCT Filed: Sep. 11, 1991
[86] PCT No.: PCT/EP91/01729
§ 371 Date: Jul. 14, 1992
§ 102(e) Date: Jul. 14, 1992
[87] PCT Pub. No.: WO92/05618
PCT Pub. Date: Apr. 2, 1992

[30] Foreign Application Priority Data

Sep. 14, 1990 [DE] Germany .................. 40 29 271.1

[51] Int. Cl.$^6$ ................................................ H02K 1/00
[52] U.S. Cl. ................ 310/179; 310/44; 310/216; 310/154; 310/254; 310/261
[58] Field of Search .................. 310/179, 44, 261, 310/262, 181, 192, 203, 208, 180, 181, 67 R, 216, 269, 154, 254

[56] References Cited

U.S. PATENT DOCUMENTS

| | | |
|---|---|---|
| 1,689,188 | 10/1928 | Pohl et al. . |
| 1,816,795 | 7/1931 | Pohl . |
| 3,255,512 | 6/1966 | Lochner ........................ 310/44 |
| 3,707,638 | 12/1972 | Nailen . |
| 4,154,082 | 5/1979 | Beech . |
| 5,045,742 | 9/1991 | Armstrong ..................... 310/261 |
| 5,102,306 | 4/1992 | Liu ................................. 310/179 |
| 5,126,606 | 6/1992 | Hofmann ....................... 310/208 |
| 5,352,948 | 10/1994 | Kim ............................... 310/208 |

FOREIGN PATENT DOCUMENTS

| | | |
|---|---|---|
| 0373987 | 6/1990 | European Pat. Off. . |
| 2050029 | 3/1971 | France . |
| 2370381 | 11/1977 | France . |
| 1814977 | 8/1970 | Germany . |

*Primary Examiner*—R. Skudy
*Attorney, Agent, or Firm*—Spencer & Frank

[57] ABSTRACT

An electric machine includes an exciter part and an induction part disposed adjacent the exciter part. The exciter part and the induction part define an air gap there-between and are movable relative to one another thereby defining a direction of movement. The induction part includes teeth disposed adjacent one another and projecting in a direction toward the air gap. The teeth define grooves therebetween, each of the teeth having a tooth base and a tooth tip adjacent the air gap. In addition, each of a plurality of the teeth further includes a middle portion having two ends and a constant width defined in a direction along the air gap and perpendicular to the direction of movement; and a pair of tooth widening portions, each of the tooth widening portions having a free end and a transition end and being located at one of the two ends of the middle portion at the transition end thereof for forming one of the plurality of teeth with the middle portion. Each of the tooth widening portions further has a dimension defined in the direction of movement which decreases from a corresponding end of the middle portion toward the free end, and a width defined in the direction along the air gap and perpendicular to the direction of movement which decreases from a corresponding tooth base toward a corresponding tooth tip.

14 Claims, 2 Drawing Sheets

ELECTRIC MACHINE

FIELD OF THE INVENTION

The invention relates to an electric machine comprising an induction part provided with conductor coils, and an exciter part, with an air gap being provided between said induction part and said exciter part, the induction part and the exciter part being movable relative to each other and the induction part having grooves provided with coils between adjacent teeth projecting in the direction towards the air gap.

BACKGROUND OF THE INVENTION

With conventional electric machines, the cross-section of the induction part teeth—as seen in a section parallel to a plane along the air gap—is at least substantially constant across the height of each tooth, i.e. progressively from the tooth tip adjacent the air gap to the tooth base. This conventional design is not optimum with respect to the magnetic flux conditions in the teeth of the induction part. For, when progressing from the tip to the base of a tooth, an increasing number of windings of the coils located in the grooves participate in the production of magnetic stray flux from tooth to tooth across the groove located therebetween, so that the magnetic flux density is considerably higher at the base or root of the tooth than at the tip of the tooth. Consequently, the tip of the tooth is magnetically not fully utilized, whereas the base of the tooth sets the limit of magnetic utilization.

It is the object of the invention to provide an electric machine of the type indicated at the outset, in which the magnetic flux density utilization of the teeth of the induction part is improved.

SUMMARY OF THE INVENTION

For meeting this object, the electric machine according to the invention is characterized by teeth of the induction part, the width of which—as measured parallel to a plane along the air gap and at right angles to the direction of relative movement of induction part and exciter part—is greater at the respective tooth base than at the respective tooth tip adjacent the air gap. Thus, according to the invention, the particular tooth presents a cross-section which increases in the direction from the tip to the base of the tooth, whereby the magnetic flux density, when one progresses in this direction, changes to a lesser extent than in the prior art. Preferably the entire tooth width increases gradually from the tip to the base of the tooth in such a manner that the magnetic flux density is substantially constant along the particular tooth.

It is pointed out that it is not cogently necessary that all induction part teeth of the machine be constructed in the manner as described hereinbefore. Depending on the constructional design of the machine, it may be sufficient that only part of the teeth is designed in this manner. Furthermore, reference is made to the case that part of the teeth is not provided with coils; especially in case of such teeth, the broadening or widening according to the invention can be dispensed with.

The electric machine according to the invention may be an electric motor or a generator for generating current. It may be a linear or a rotatory machine.

Within the class of rotatory electric machines, it may be a machine with a cylindrical air gap or a machine with a planar air gap extending at right angles to the axis of rotation (disk armature construction type).

A preferred development of the invention provides that the tooth widening portions provided in comparison with the respective tooth tip are formed at their free ends—as measured in the direction of relative movement—with smaller dimensions than at their transition ends. In this manner, the grooves widen as measured in the direction of relative movement—at those locations where the tooth widening portions are. Consequently, the magnetic stray fluxes are reduced directly from one tooth widening portion to the next tooth widening portion.

Preferably the magnetic return path portions between the teeth—as measured in the same direction as said tooth width—have substantially the same width as the adjacent teeth bases. In this manner, a substantially constant magnetic flux cross-section can be presented to the magnetic flux from one tooth base through the magnetic return path portion located there to an adjacent tooth base, and it can be avoided that the magnetic flux density is higher in the return path portions than in the teeth bases. However, there are further geometric possibilities of obtaining the desired substantially constant magnetic flux cross-section also in the magnetic return path. In particular, the magnetic return path portions as measured at right angles to a plane extending along the air gap can be thickened.

It is preferred as a further development of the invention that, of said induction part, at least the tooth widening portions provided in comparison with the respective tooth tip consist of an isotropic ferromagnetic material of high electrical resistance. In the tooth widening portions, the magnetic flux is not aligned exactly in the direction from tooth tip to tooth base, so that the construction of layered, mutually isolated sheet metal parts, as is usual for avoiding eddy current losses, does not yield perfect results in the tooth widening portions. A remedy in this respect is provided by this further development measure. It is possible and preferred to make further magnetic flux carrying components of the induction part of an isotropic ferromagnetic material, in particular the base or root portions of the teeth and/or the teeth as a whole and/or the magnetic return path portions. The magnetic flux carrying component of the induction part may also be made in its entirety of such material. As a preferred example of the material, a plastics bound metal powder material is indicated. Parts made of the above material can be produced in particularly efficient manner and are good to machine.

The invention can be employed with all types of electric machines having an induction part provided with conductor coils and teeth projecting in the direction towards the air gap. However, particularly preferred are electric machines having an exciter part composed with permanent magnets. The permanent magnets preferably consist of a material based on rare earths and cobalt or based on rare earths and neodyme, with samarium cobalt or iron neodyme being particularly preferred.

The machine preferably is an electronically commutated electric motor.

While most of the conventional electric machines have conductor coils which are directly contiguous for several teeth and are typically wound of one and the same current conductor in successive manner, thereby forming coil heads, it is preferred according to a further development of the invention to construct the machine according to the invividual coil principle. According to the latter, each particular induction part tooth is provided with an indivudal coil, and the two ends of the current conductors of the respective coil are connected so as to supply current and discharge current, respectively. This may be done such that each coil is connected individually or that all coils are coupled together and are connected in common or that groups or partial numbers of coils are coupled together and that these are connected as groups. "Connecting" means in case of an electronically commutated machine the connection to the power part of the electronic commutation. It is pointed out that there are embodiments in which not every tooth is provided with a coil, but in particular only every other tooth.

The machine preferably is composed in accordance with the flow concentration principle. A typical, preferred example of the construction in accordance with the flow concentration principle consists in that the permanent magnets—as seen at right angles to the axis of rotation—are substantially triangular and are magnetized in the peripheral direction, that portions of magnetically conductive material alternate with the permanent magnets in the peripheral direction, and that the air gap facing magnetic flux outlet areas of these portions of magnetically conductive material are each smaller than the sum of the magnetic flux cross-sections of the two adjacent permanent magnets.

BRIEF DESCRIPTION OF THE DRAWINGS

The invention and developments of the invention will be elucidated in more detail hereinafter on the basis of an embodiment shown schematically in the drawings in which.

DETAILED DESCRIPTION OF THE INVENTION

Figure 1:
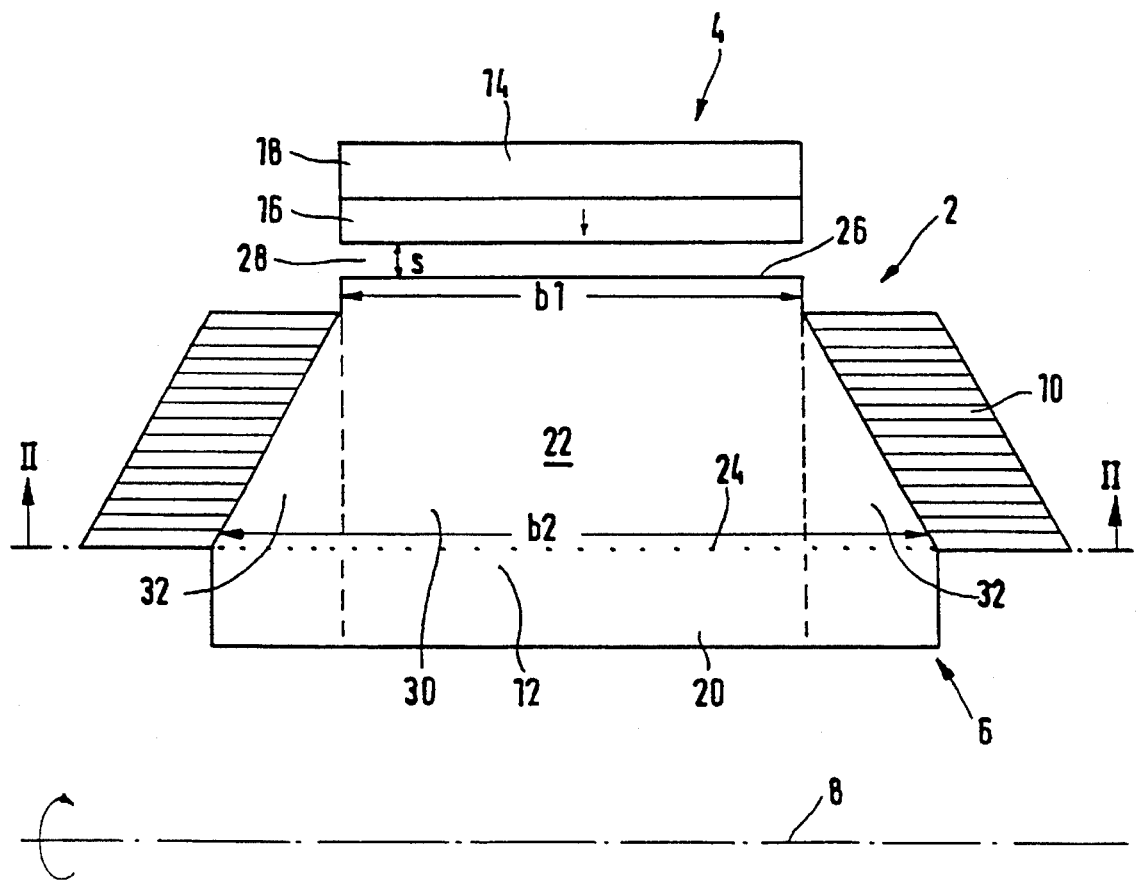
FIG. 1 shows a longitudinal sectional view of a rotatory electric motor through the axis of rotation thereof, depicting only the upper half of the motor.

The electric motor 2 shown schematically in FIG. 1 is a so-called external rotor motor in which a substantially hollow cylindrical rotor 4 surrounds a stator 6 having a substantially cylindrical outer circumference. Rotor 4 as a rule is substantially hollow so that it may be supported axially beside stator 6. Rotor 4 is adapted to rotate relative to stator 6 about an axis 8 of rotation as outlined schematically in FIG. 1.

FIG. 1 shows of stator 6 those parts that are essential to the function of motor 2, namely an induction part 12 provided with conductor coils 10. The part of rotor 4 that is essential to the function of motor 2 is an exciter part 14, as shown, which in essence consists of a circumferentially distributed row of permanent magnets 16 and of a return path ring 18 radially outside thereof. Permanent magnets 16 are magnetized in a radial direction, with a south pole inside alternating with a north pole inside—when progressing in the peripheral direction.

Of stator 6, the non-hatched portion 12 is the magnetic flux carrying component of the induction part. Induction part 12 integrally consists in essence of an in total annular magnetic return path portion 20 and teeth 22 projecting outwardly from magnetic return path ring 20. The boundary between both portions is illustrated by dotted line 24. When progressing in the peripheral direction, an axially extending groove 25 is provided between two adjacent teeth 22 each (FIGS. 2a and 26b).

For each tooth 22 there is provided an individual coil 10. The current conductor of the individual coil 10 extends in the two participating grooves 25 substantially in an axial direction and passes around the two axial ends of the associated tooth 22. Individual coils 10 are connected separately or in groups or all together to a current output of a power part of a control means, not shown, for electronic commutation of motor 2.

Between the tip 26 of tooth 22 shown at the top in FIG. 1 and the pole face of the illustrated permanent magnet 16, which faces downwardly in FIG. 1, there is a cylindrical air gap 28 having a radial thickness s. The tooth tip 26, as measured in axial direction, i.e. from left to right in FIG. 1, has a width b1. The base 30 of ilustrated tooth 22, which is adjacent magnetic return path portion 20 has a width b2 as measured in an axial direction. It can be seen that width b2 is larger than width b1. The design in concrete terms is such that on both ends a linearly increasing widening of tooth 22 starts somewhat below the air gap facing pole face of tooth 22 (namely where coil 10 begins). In comparison with the tooth tip 26, this provides tooth widening portions 32 which are of triangular configuration in the sectional view of FIG. 1. Thus, a magnetic flux cross-section increasing from the tip 26 to the base 30 of the tooth is constituted for the magnetic flux in tooth 22, which has a substantially vertical flow direction in FIG. 1. The magnetic return path ring 20 also has the width b2.

Figure 2A:
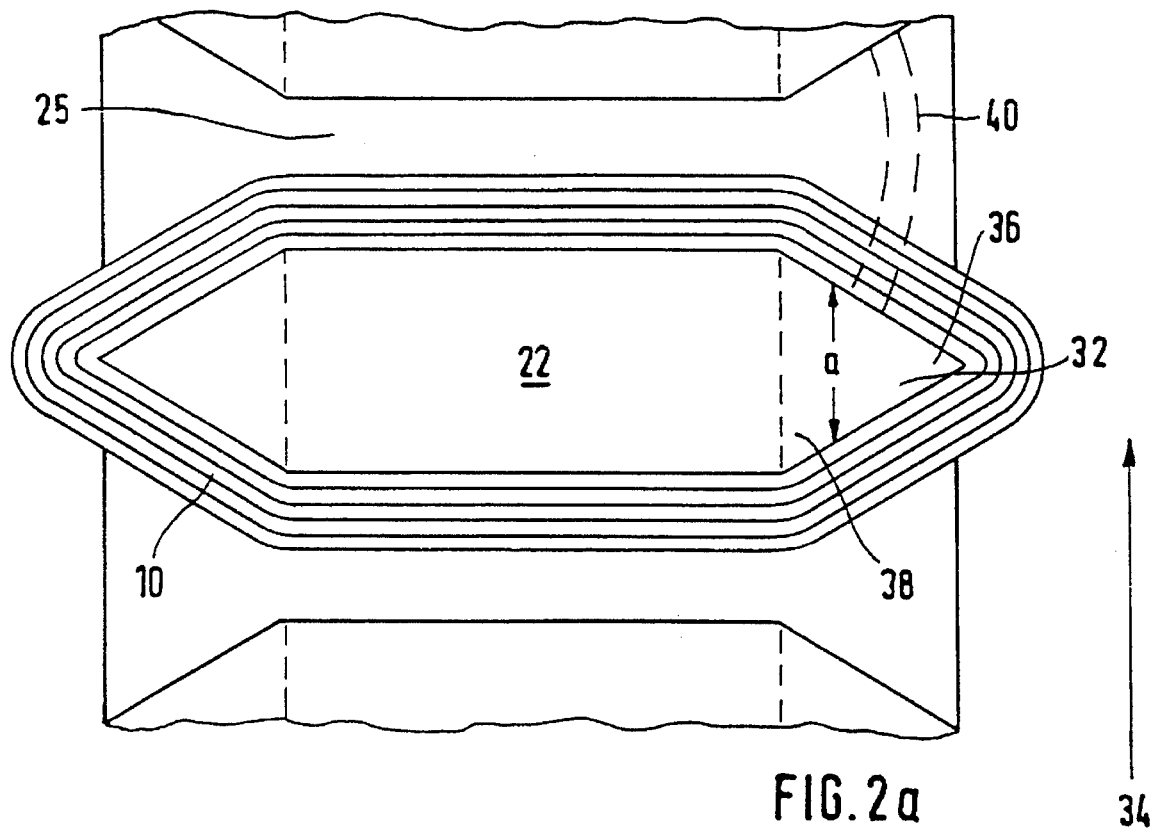
FIGS. 2a and 2b show a sectional view of two embodiments of the invention along the line II—II in FIG. 1, as developed from a cylindrical sectional area to a plane.
Figure 2B:
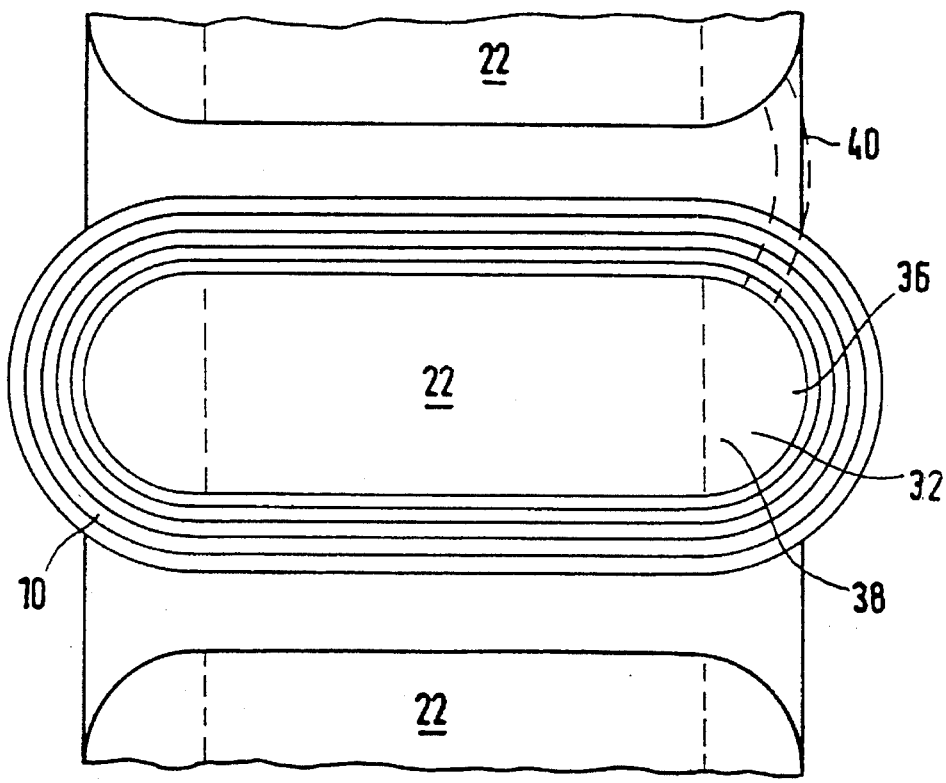

It can be seen in FIGS. 2a and 2b that the tooth widening portions 32—as measured in the direction 34 of relative movement of rotor 4 and stator 6—have smaller dimensions at their free ends 36 projecting farthest in both axial directions as compared to their transition ends 38 where they merge with the remainder of tooth 22 (that is, tooth 22 if no tooth widening portions 32 were present). It is clear from the figures that this remainder of the tooth is sa middle portion which has a constant width b1 in the axial direction, and which has two ends corresponding to the transition ends of the tooth widening portions. In concrete terms, the tooth widening portions 32 as seen in the radial viewing direction of FIGS. 2a and 2b are, for instance, of triangular configuration (FIG. 2a) or of semi-circular configuration (FIG. 2b). Magnetic stray fluxes outlined by reference numeral 40 and attempting to flow from one tooth widening portion 32 to a peripherally adjacent tooth widening portion 32 while evading the magnetic return path ring 20, consequently find a longer path through air there, so that the formation of such stray fluxes is counteracted.

Preferably at least the tooth widening portions 32 of induction part 12 consist of isotropic ferromagnetic material since this provides the best possible control with respect to avoiding eddy currents especially in the tooth widening portions 32. However, it is possible as well to produce also the teeth 22 and/or the magnetic return path portion 20 of such material.

A preferred modification of exciter part 14 consists in providing—as seen in a sectional plane at right angles to axis 8 of rotation—substantially triangular permanent magnets 12 having their tip directed radially inwardly and being magnetized in the peripheral direction, with magnetically conductive portions being located between peripherally adjacent permanent magnets 16. In accordance with the flow concentration principle the design can be such that the magnetically conductive portions have a radially inwardly directed magnetic outlet area that is smaller than the sum of the two radially measured magnetic flux cross-sections of the two peripherally adjacent permanent magnets 16.

What is claimed is:

1. An electric machine comprising an exciter part;

an induction part disposed adjacent the exciter part, the exciter part and the induction part defining an air gap therebetween and being moveable relative to one another thereby defining a direction of movement, the induction part further including:

teeth disposed adjacent one another and projecting in a direction toward the air gap, the teeth defining grooves therebetween, each of the teeth having a tooth base, and a tooth tip adjacent the air gap, each of a plurality of the teeth including:

a middle portion having two ends and a constant width defined in a direction along the air gap and perpendicular to the direction of movement; and a pair of tooth widening portions, each of the tooth widening portions having a free end and a transition end and being located adjacent one of the two ends of the middle portion at the transition end thereof for forming said each of the plurality of the teeth with the middle portion, each of the tooth widening portions further having a dimension defined in the direction of movement which decreases from a corresponding end of the middle portion toward the free end, and a width defined in the direction along the air gap and perpendicular to the direction of movement which decreases from a corresponding tooth base toward a corresponding tooth tip; and conductor coils disposed within the grooves.

2. The electric machine according to claim 1, wherein the width of said each of the plurality of the teeth decreases gradually from the corresponding tooth base to the corresponding tooth tip such that a magnetic flux density generated by the conductor coils is constant along said each of the plurality of the teeth.

3. The electric machine according to claim 1, wherein the induction part further includes a magnetic return path portion having a width defined in a direction along the air gap and perpendicular to the direction of movement which is substantially equal to a width of the tooth base of said each of the plurality of the teeth, the teeth being disposed on the magnetic return path portion at respective tooth bases thereof.

4. The electric machine according to claim 1, wherein the tooth widening portions are made of an isotropic ferromagnetic material of high electrical resistance.

5. The electric machine according to claim 4, wherein all magnetic flux carrying components of the induction part are substantially made of an isotropic ferromagnetic material of high electrical resistance.

6. The electric machine according to claim 4, wherein the isotropic ferromagnetic material is a plastics bound metal powder material.

7. The electric machine according to claim 1, wherein the exciter part includes permanent magnets.

8. The electric machine according to claim 7, wherein the permanent magnets are made of rare earths and one of cobalt and iron.

9. The electric machine according to claim 1, consisting of an electronically commutated electric motor.

10. The electric machine according to claim 1, further including an electronically commutative power source operatively associated with the induction part, wherein the conductor coils comprise individual coils corresponding to individual ones of said each of the plurality of the teeth and connected to the power source.

11. The electric machine according to claim 10, wherein each of the individual coils are individually connected to the power source.

12. The electric machine according to claim 10, wherein the individual coils are interconnected in groups, each of the groups being connected to the power source.

13. The electric machine according to claim 10, wherein all of the individual coils are interconnected in one group, the group being connected to the power source.

14. The electric machine according to claim 1, wherein the machine is constructed according to flow concentration principles.

* * * * *